United States Patent [19]

Ooka et al.

[11] Patent Number: 5,065,612
[45] Date of Patent: Nov. 19, 1991

[54] METHOD OF CORRECTING ZERO POINT OF GYRO AND APPARATUS THEREFOR

[75] Inventors: Akihiro Ooka; Kazuo Hirano, both of Osaka, Japan

[73] Assignee: Sumitomo Electric Industries, Ltd., Osaka, Japan

[21] Appl. No.: 404,402

[22] Filed: Sep. 8, 1989

[30] Foreign Application Priority Data

Sep. 28, 1988 [JP] Japan .............................. 63-245703

[51] Int. Cl.$^5$ .............................................. G01P 21/00
[52] U.S. Cl. .................................. 73/1 D; 364/571.02
[58] Field of Search .................................. 73/504, 1 D; 364/571.02

[56] References Cited

U.S. PATENT DOCUMENTS 4,470,124  9/1984  Tagami et al. ........................ 73/1 D Primary Examiner—John Chapman
Attorney, Agent, or Firm—Lane, Aitken & McCann

[57] ABSTRACT

A method of correcting a zero point of a gyro, comprises the steps of detecting a speed of a moving body and outputting a speed signal corresponding to the speed; determining with the speed signal whether the moving body is at a stopping condition; computing an average value of output values of the gyro within a constant time in which the moving body is at the stopping condition, and setting the average value to a new zero point of the gyro; and correcting an output value of the gyro with the new zero point. An apparatus for correcting a zero point of a gyro, comprises a speed sensor for detecting a speed of a moving body and outputting a speed pulse signal corresponding to the speed; a flip-flop circuit which is set by the speed pulse signal of the speed sensor; and a zero-point correcting circuit wherein it is determined with a level of an output of the flip-flop circuit and with an output of a timer whether the moving body is at a stopping condition and wherein a zero point of the gyro is corrected with an average value of outputs of the gyro at the same time the moving body is at the stopping condition, the zero point correcting circuit outputting a clear signal to the flip-flop circuit, the flip-flop circuit being cleared by the clear signal and then set by the speed pulse signal.

4 Claims, 1 Drawing Sheet

METHOD OF CORRECTING ZERO POINT OF GYRO AND APPARATUS THEREFOR

FIELD OF THE INVENTION

The present invention relates to a method of correcting a zero point of a gyro which is used in the azimuth detection of moving bodies such as vehicles and the like, and to an apparatus for carrying out such a method.

DESCRIPTION OF THE PRIOR ART

As azimuth detection means of moving bodies such as vehicles and the like, a method that employs a gyro is well known. The azimuth of a moving body is obtained by integrating the gyro output (angular velocity output). In this case, if there is an error in the zero point of the gyro, the error will become larger and larger due to the integration. It is therefore necessary that the zero point is set with a high degree of accuracy.

In the prior art, the setting of zero point of the gyro is made by detecting a zero point value as an initialization prior to the travel of a moving body, and thereafter an angular velocity output (gyro output) is used on the basis of the zero point value.

However, depending upon environmental conditions (particularly temperature), the zero point of the gyro is subject to deviate. In order to minimize this deviation, it is required to provide an additional function of temperature compensation or to manufacture a gyro of high accuracy which does not depend upon the variation of temperature. This results in an increase in production cost.

Therefore, it is an object of the present invention to provide a novel zero-point correcting method and an apparatus therefor wherein a zero point of a gyro is accurately set independently of environmental conditions.

Another object of the present invention is to provide a novel zero-point correcting method and an apparatus therefor wherein deviation in a zero point of a gyro is eliminated and overcome with a relatively inexpensive gyro.

SUMMARY OF THE INVENTION

The foregoing objects are accomplished in accordance with the present invention by providing a method of correcting a zero point of a gyro, which comprises the steps of detecting a speed of a moving body and outputting a speed signal corresponding to the speed; determining with the speed signal whether the moving body is at a stopping condition; computing an average value of output values of the gyro within a constant time in which the moving body is at the stopping condition, and setting the average value to a new zero point of the gyro; and correcting an output value of the gyro with the new zero point.

The foregoing objects are also accomplished in accordance with the present invention by providing an apparatus for correcting a zero point of a gyro, which comprises a speed sensor for detecting a speed of a moving body and outputting a speed pulse signal corresponding to the speed; a flip-flop circuit which is set by the speed pulse signal of the speed sensor; and a zero-point correcting circuit wherein it is determined with a level of an output of the flip-flop circuit and with an output of a timer whether the moving body is at a stopping condition and wherein a zero point of the gyro is corrected with an average value of outputs of the gyro at the time the moving body is at the stopping condition, the zero point correcting circuit outputting a clear signal to the flip-flop circuit, the flip-flop circuit being cleared by the clear signal and then set by the speed pulse signal.

In order to overcome the problems described above, it is determined whether a moving body is at a stopping condition, on the basis of a speed pulse signal obtained from the moving body, and a zero point of the gyro is updated on the basis of an output of the gyro at the time the moving body is at the stopping condition.

BRIEF DESCRIPTION OF THE DRAWINGS

The above and other objects and advantages will become apparent from the following detailed description when read in conjunction with the accompanying drawing wherein.

DESCRIPTION OF THE PREFERRED EMBODIMENTS

Figure 1:
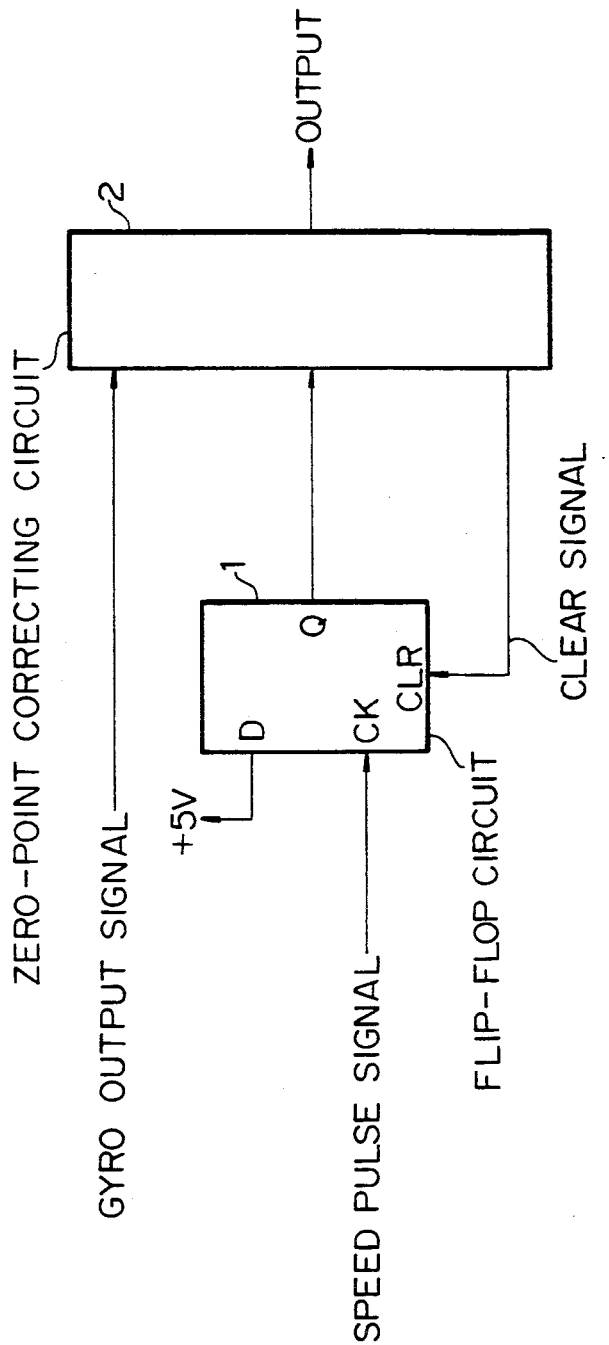
FIG. 1 is a block diagram illustrating schematically a zero-point correcting apparatus constructed in accordance with the present invention.

In FIG. 1, a preferred embodiment of the apparatus according to the present invention comprises a flip-flop circuit 1 which is set by a speed pulse signal obtained from a moving body, and a zero-point correcting circuit 2 to which an output signal of the flip-flop circuit 1 and an output signal of a gyro (not shown) are inputted. The flip-flop circuit 1 is cleared by a clear signal outputted from the zero-point correcting circuit 2.

The speed pulse signal corresponding to a speed of the moving body is detected by a conventional speed sensor (not shown) and inputted to the flip-flop circuit 1.

The gyro (not shown) is well known in the prior art and thus the description will hereinafter be omitted. The output signal of the gyro is transmitted through an AD (analog-to-digital) converter circuit (not shown) to the zero-point correcting circuit 2. Naturally, it is also possible that the gyro output is analog processed, in which case a correction value of a zero point of the gyro is set as analog data, and an analog gyro output signal is transmitted to the zero-point correcting circuit 2.

The zero-point correcting circuit 2 comprises, for example, 1 chip CPU (central processing unit). In the 1 chip CPU of the zero-point correcting circuit 2, constant times T0, T1 and T2 are controlled, and the integration of the gyro output values (during T1), computation of an average value of the gyro output values (after the lapse of T1) and update of the zero point (after the lapse of T2) are made while the level of the flip-flop circuit 1 is confirmed during the constant times T0, T1 and T2. In the zero-point correcting circuit 2, during the constant time T0 from a certain time, it is determined by the level of the flip-flop circuit 1 whether there is a speed pulse signal corresponding to the speed of the moving body. That is, when the level of the flip-flop circuit 1 is low, the speed pulse signal does not occur and thus it can be determined that the moving body is at stopped condition. On the other hand, when the level of the flip-flop circuit 1 is high, the speed pulse signal occurs and thus it can be determined that the moving body is in a moving condition. In the case that there is no speed pulse signal during the constant time T0, it is determined that the moving body is at a stopped condition, and the output values of the gyro are integrated during the constant time T1 from the constant time T0. An average value of the gyro output values is then set to a zero-point correction value, and during the constant time T2 from the constant time T1, it is again determined by the level of the flip-flop circuit 1 whether there is a speed pulse signal corresponding to the speed of the moving body. If the pulse signal does not occur during the constant time T2, the previous zero point of the gyro is then updated with the zero-point correction value obtained after the lapse of constant time T1.

That is, if there occurs no speed pulse signal during all the constant times T0+T1+T2, it is determined that the moving body is at the stopped condition. Thereafter, an accurate angular velocity is obtained on the basis of a new zero point. It should be noted that, until the zero point is updated, the gyro output is also obtained through the zero-point correcting circuit 2 during each of the constant times T0, T1 and T2 on the basis of the previous zero point.

By suitably setting constant times T0, T1 and T2 according to the condition of the speed pulse signal obtained from the moving body, it can be determined that the moving body is at the stopped condition, if the speed of the moving body is less than a predetermined reference. For example, it is assumed that a speed pulse signal of 40 Hz is obtained at a speed of 60 km/hr with a speed sensor for detecting a speed of a vehicle. If the speed pulse signal is not obtained during 15 seconds (T0=T1=T2=5 seconds), the vehicle speed will become less than 0.1 km/hr. Because in a vehicle there are normally no speeds of less than 0.1 km/hr, it can be determined that the vehicle is at the stopped condition.

The reason why the constant times T0 and T2 are set is because the azimuth change of a moving body is possible at the time of deceleration or acceleration. By setting the constant times T0 and T2 according to the characteristics of a moving body, the estimation of the stopped condition is made more effectively and an accuracy of zero-point correction thus increased.

At the time of the integration of the gyro output during the constant time T1, it may also be determined whether the gyro output and the output deviation are less than predetermined levels, respectively. This is for the purpose of preventing a false detection, for example, in the case that in a three dimensional parking area the azimuth change of a vehicle occurs at the time the vehicle is at a stop. In this case, the level of the gyro output used as a criterion can be set from the region of the deviation of the gyro zero point, and the level of the output deviation used as a criterion can be set by evaluating in advance the output deviation at the time the vehicle is at a stop.

The flip-flop circuit 1 is cleared by the zero-point correcting circuit 2 at the time the zero-point correcting circuit 2 starts measuring the constant time T0, and is then set by the speed pulse thereafter.

In the present invention, the stopped condition of the moving body is estimated, and the zero point value is updated each time the moving body stops. Accordingly, the zero point can be accurately set independently of environmental conditions. In addition, because the apparatus of the present invention does not require a temperature compensation circuit for holding the zero point, the deviation in the gyro zero point can be eliminated and overcome with a relatively inexpensive gyro.

While it has been described that the zero-point correcting circuit corrects only the gyro output, it is possible to add a function, which outputs an azimuth change (integrated value) from a certain time, to the zero-point correcting circuit 2. Also in a moving body incorporating therein a locator for detecting a position, it is possible to add the aforesaid function of zero-point correction to a computer within the locator. Also, the estimation of a vehicle stopped condition can be made with high accuracy, by setting the constant times T0, T1 and T2 in accordance with the condition of movement of a moving body and the condition of incidence of speed pulses.

Although the invention has been described with a certain degree of particularity, it is understood that the present disclosure has been made only by way of example and that numerous changes in the details of the construction and the combination and arrangement of parts may be made without departing from the scope of the invention as hereinafter claimed.

What we claim is:

1. A method of correcting a zero point of a gyro, comprising the steps of:

detecting a speed of a moving body and outputting a speed signal corresponding to said speed;

when said speed signal is less than a predetermined reference for a first predetermined period of time from a certain time, determining that said moving body is in a stopped condition;

computing an average value of output values of the gyro for a second predetermined period of time immediately after said first predetermined period of time, and setting a zero point correction value to said average value;

determining whether said speed signal is less than said predetermined reference for a third predetermined period of time immediately after said second predetermined period of time; and when said speed signal is less than said predetermined reference for all said first, second and third predetermined periods of time, setting the zero point of the gyro to an updated value corresponding to said zero point correction value and correcting an output value of the gyro with said updated value of said zero point.

2. A method as set forth in claim 1, wherein said moving body comprises a vehicle.

3. An apparatus for correcting a zero point of a gyro, comprising:

a speed sensor for detecting a speed of a moving body and outputting a speed pulse signal corresponding to the speed;

a flip-flop circuit which is set by said speed pulse signal of said speed sensor; and a zero-point correcting circuit which determines from a level of an output of said flip-flop circuit whether there exists said speed pulse for a first predetermined period of time from a certain time, and determines that said moving body is in a stopped condition, when no speed pulse signal occurs for said first predetermined period of time, and computes an average value of output values of said gyro for a second predetermined period of time immediately after said first predetermined period of time and sets a zero point correction value to said average value, and determines from a level of an output of said flip-flop circuit whether there exits said speed pulse for a third predetermined period of time immediately after said second predetermined period of time, and sets the zero point of said gyro to an updated value corresponding to said zero point correction value and corrects an output value of the gyro with said updated value, when no speed pulse signal occurs for all said first, second and third predetermined period of time, and the zero point correcting circuit outputting a clear signal to said flip-flop circuit, the flip-flop circuit being cleared by said clear signal and then set by said speed pulse signal.

4. An apparatus as set forth in claim 3, wherein said moving body comprises a vehicle.

* * * * *